Patented Jan. 28, 1941

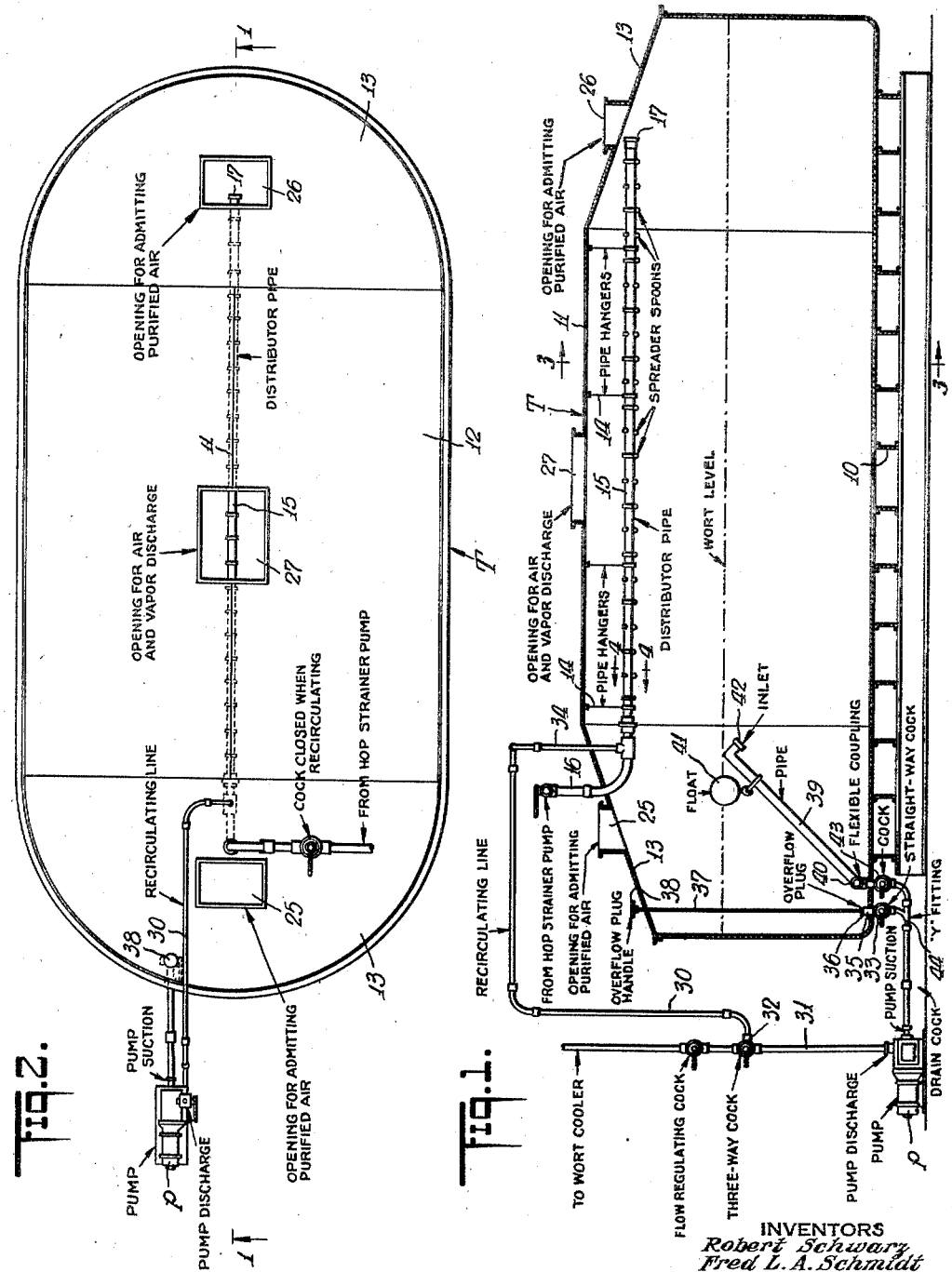

2,229,875

UNITED STATES PATENT OFFICE 2,229,875

ART OF WORT COOLING

Robert Schwarz, White Plains, and Fred L. A. Schmidt, Hollis, N. Y., assignors to Schwarz Laboratories Inc., New York, N. Y., a corporation of New York Application March 15, 1940, Serial No. 324,079

5 Claims. (Cl. 99—52)

The present invention relates to methods for cooling wort at the stage after it leaves the hop separator for the relatively coarse precipitation of nitrogenous substances and hop resins, soluble in the hot wort prior to yeast pitching.

The invention has as an object an expeditious and sanitary procedure, involving relatively compact and simple equipment, dispensing with the need for tremendous floor areas required for conventional surface coolers or coolships and the need for air conditioning the room, and yet assuring enhanced speed of cooling and accuracy of control of the rate of cooling of the wort after separation of spent hops therefrom, for effective removal of nitrogenous substances and hop resins therefrom by precipitation.

Generally speaking, the invention involves cooling the wort by evaporation in a cycle which includes the passage of clean, filtered air or air rendered germ-free by other methods, along or across the path of a flat expanded stream in which the wort is introduced into a closed chamber. Where the cooling after such operation is inadequate, the wort or some of it is pumped in one or more repetitions of said cycle until the desired cooling has been effected.

The present application is a continuation in part of our copending application, Serial No. 218,964, filed July 13, 1938 for Mechanical coolship.

Figure 3:
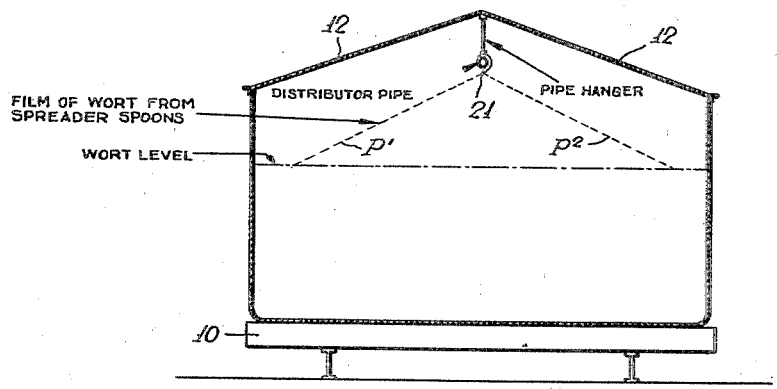
Figure 4:
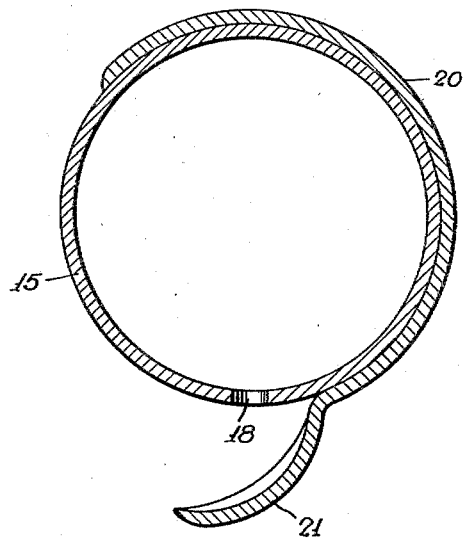
Figure 5:
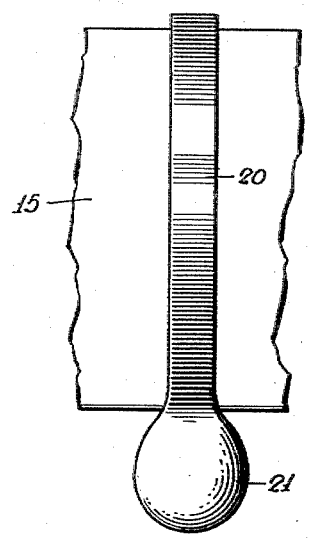

In the accompanying drawings in which is shown one of various possible installations for carrying out the several steps of the method of the present invention, Fig. 1 is a diagrammatic view in longitudinal cross-section taken on line 1—1 of Fig. 2, of a preferred form of mechanical coolship according to the invention, Fig. 2 is a plan view thereof, Fig. 3 is a sectional view thereof, taken on line 3—3 of Fig. 1, Fig. 4 is a view in greatly enlarged cross-section taken on line 4—4 of Fig. 1, and Fig. 5 is a fragmentary side elevation of the structure shown in Fig. 4.

Referring now to the drawings, there is shown a mechanical coolship, comprising a large sheet metal tank T supported on a channel beam foundation 10 and having a roof with a central beam 11, sloping side walls 12 and inwardly sloping end walls 13. Suspended from the beam 11 by hangers 14 and extending longitudinally of the tank and symmetrically spaced from the sloping side walls 12 thereof is a horizontal wort distributor pipe 15, which preferably has an upwardly directed inlet elbow 16 adapted to be connected to a hop strainer pump as indicated. The distributor pipe which is preferably closed by a plug 17 at the extremity thereof opposite the inlet has a multiplicity of preferably uniformly spaced downwardly opening ports 18 through which the wort is emitted in its flow from the hop separator.

Near the ports 18 are fixed spreaders or baffles, constructed and arranged to deflect wort to cause it to spread or fan out in the form of thin films or flat streams for exposing the relatively tremendous surface area of the two faces of said wort film or flat stream to the evaporating effect of air in motion, as set forth hereinafter. Desirably the spreading devices are in the form of spreader spoons carried by the pipe. In a preferred embodiment each spoon comprises a hanger strap 20 snugly embracing the pipe 15 and is shaped at its extremity as the spoon bowl 21 the concavity of which extends directly under the corresponding port 18 and slopes obliquely downward so that it serves to baffle the wort dropping thereon and to spread it outward and downward in the desired flat fan-shaped film.

Preferably consecutive spoons extend alternately in opposite directions as shown in Figs. 1 and 3, so that in operation the hot wort from the hop strainer, either pumped or allowed to flow by gravity into the distributor pipe 15, is spread to flow downward to the bottom in two diverging planes P' and P² all as suggested in Fig. 3. Thus a tremendously large surface area of the flowing wort relative to its volume is exposed to the cooling effect of air as will now be set forth, for effectiveness of cooling by evaporation.

For supplying the air which serves as the cooling medium, it is desirable to have a pair of air inlet ports 25 and 26 near the opposite ends of the sloping roof of the tank and an air outlet port 27 near the middle of the tank roof. Air being thus blown through the two inlets, passes along and across the tent-shaped films P' and P² of hot wort dropping toward the bottom of the tank and therefore effects evaporation of some of the wort with corresponding cooling thereof.

The hot wort flows continuously into the tank T and in such flow is constantly met and cooled by filtered or otherwise germ freed air set forth. This operation is continued until all of the wort has been discharged from the hop separator, at which time it will fill the tank T to a level, usually of about five feet, but the level may be higher or lower depending on circumstances of operation. While in certain applications the operation set forth may be sufficient to cool the hot wort to the temperature required to complete the precipitation desired in the coolship, the cooling may in some instances be insufficient for the purpose.

Accordingly the present invention provides means for recirculating all or part of the wort delivered to the tank T to repeat the cooling cycle to whatever extent is necessary to effect the desired cooling. For this purpose a three way valve 32 is provided which when appropriately set delivers from the wort cooler pipe 31 to a recirculating pipe 30. When the latter is set for recirculation, pump p draws wort from the lower part of tank T past cock 33 and delivers it through pipe branch 34 to distributor pipe 15. Preferably a short standpipe 35 serves to intercept any precipitate lodged in the bottom of the tank T. The standpipe is desirably normally closed by plug 36 connected by rod 37 to handle 38 accessible from the top of the tank for raising plug 36 preparatory to recirculation or delivery to the wort cooler as the case may be. In a preferred mode of operation no further wort is passed into tank T while the wort is being recirculated through the pipe 30 for further cooling.

For further assurance that none of the precipitate is carried off to the wort cooler, it is desirable to draw off the contents of the coolship tank from near the upper level of the wort therein. To this end a pipe 39 connected at its lower end 40 to a flexible coupling is held in elevated position by the float 41 so that the inlet at the upper end 42 of said pipe is but an inch or two below the surface of the liquid.

Alternative connection from near the bottom of the tank for recirculation, and from near the top thereof for discharge for the wort cooler is effected by mounting cock 33 on one arm of a Y-fitting 44, the stem of which is connected to pump p, the other arm of said fitting mounting the cock 43 through which pipe 39 discharges. Thus during the time that the wort is being pumped from the collecting tank to the wort cooler the pump draws from the upper level only, where the maximum clarification has occurred and the likelihood of any precipitated proteins and resins being carried out of the wort collecting tank to the Baudelot type cooler and from there into the fermenters, is substantially eliminated.

By the method of the present invention, the coarse sludge or flock in the hot wort remains effective to adsorb the finer precipitate that forms as the cooling proceeds, so that the cooled wort is clear and remains clear. Were the coarser sludge mechanically broken up in the course of cooling, its effectiveness to carry with it the finer precipitate subsequently forming would be greatly impaired if not destroyed.

While the method claimed herein has been illustratively shown as carried out substantially with the mechanical coolship shown and described, and made the subject-matter of our prior application above identified, it will be understood that the method as claimed may be carried out by resort to any of a wide variety of mechanical coolship installations. It is, therefore, intended that all matter contained in the above description or shown in the accompanying drawings shall be interpreted as illustrative and not in a limiting sense.

Having thus described our invention, what we claim as new and desire to secure by Letters Patent is:

1. The method of treating wort for precipitating nitrogenous substances and hop resins therefrom, which consists in feeding wort without breaking up the coarse sludge that forms therein, by spreading the wort to drop in thin flat streams exposed to air at both faces thereof, and at the same time blowing air thereacross for cooling of the wort by evaporation.

2. The method in which part or all of the wort first treated as recited in claim 1, is recirculated for repetition of the cycle of operation set forth in said claim, until the temperature of the wort has been reduced to the desired extent.

3. The method of treating wort for precipitating nitrogenous substances and hop resins therefrom, without breaking up the coarse sludge that forms therein by baffling the wort to drop within a closed chamber in thin flat streams of large surface area relative to volume while blowing purified air in the path of said stream for cooling by evaporation and after the wort thus treated has accumulated to a level in the order of five feet, recirculating part or all of the wort thus collected for a repetition of said cycle of operation to bring the temperature of the wort down to the desired value.

4. The method of treating hot wort in the brewing art, for precipitation of nitrogenous substances and hop resins, without breaking up the coarse sludge that forms therein by spreading the wort in its flow from the hop separator as a thin substantially continuous film within a closed chamber, blowing clean air through said chamber in contact with said film and continuing said process until the wort has reached a desired level in the chamber, thereupon pumping wort from the chamber in a repeated cycle of film flow and air blowing until the wort has been cooled to a temperature of between 160 degrees to 170 degrees F. and thereafter allowing the wort to remain quiescent in the chamber for completion of the desired precipitation.

5. The method of treating wort, for precipitating nitrogenous substances and hop resins therefrom, without breaking up the coarse sludge that forms therein by baffling the wort to drop in a thin flat stream into a chamber while blowing air along the said stream until the wort has been collected to a predetermined level, discontinuing the supply of further wort, recirculating part or all of the wort from near the bottom of that collected, through the said cycle until the wort has reached a predetermined temperature, with consequent precipitation therefrom and discharging from near the upper level of the collected wort to a wort cooler.

ROBERT SCHWARZ.
FRED L. A. SCHMIDT.